United States Patent
Bailey et al.

(10) Patent No.: US 10,520,177 B2
(45) Date of Patent: Dec. 31, 2019

(54) EXTERIOR LAMP MOUNTING ADAPTOR WITH INTEGRATED ELECTRICAL INTERFACE

(71) Applicant: LES PRODUITS SUNFORCE INC., Montreal-Ouest (CA)

(72) Inventors: Simon Bailey, Montreal (CA); Michael Dahan, Hampstead (CA); Leslie Wexelman, Hampstead (CA)

(73) Assignee: LES PRODUITS SUNFORCE INC., Montreal (CA)

(*) Notice: Subject to any disclaimer, the term of this patent is extended or adjusted under 35 U.S.C. 154(b) by 109 days.

(21) Appl. No.: 15/913,437

(22) Filed: Mar. 6, 2018

(65) Prior Publication Data
US 2018/0195703 A1    Jul. 12, 2018

Related U.S. Application Data

(63) Continuation-in-part of application No. 15/367,951, filed on Dec. 2, 2016, now Pat. No. 10,168,032.

(51) Int. Cl.
*F21V 21/30* (2006.01)
*F21V 23/06* (2006.01)
(Continued)

(52) U.S. Cl.
CPC .............. *F21V 21/30* (2013.01); *F21S 8/033* (2013.01); *F21V 17/02* (2013.01); *F21V 21/02* (2013.01);
(Continued)

(58) Field of Classification Search
CPC ............. H01L 51/5218; H01L 51/5234; H01L 51/5225; H01L 51/5231; H01L 51/5221;
(Continued)

(56) References Cited

U.S. PATENT DOCUMENTS 4,952,157 A     8/1990   Hudson et al.
6,146,191 A *  11/2000   Kerr, Jr. ................. F04D 25/088
                                                              439/140
(Continued)

FOREIGN PATENT DOCUMENTS

CN      201892069         7/2011
CN      103486501         1/2014
(Continued)

OTHER PUBLICATIONS

Provisional Application Specification and Drawings U.S. Appl. No. 62/562,897; Schermerhorn et al.; Sep. 25, 2017 (Year: 2017).*

*Primary Examiner* — Anh T Mai
*Assistant Examiner* — Glenn D Zimmerman
(74) *Attorney, Agent, or Firm* — Benoit & Cote, Inc.; C. Marc Benoit

(57) ABSTRACT

A mounting adaptor for an electric light fixture to be mounted on a surface. The mounting adaptor comprising: a base and a joining member each having an interfacing face and an electrical interface, one of the base and the joining member comprising on its interfacing face a groove, the other one of the base and the joining member comprising on its interfacing face a lip adapted to cooperate with the groove thereby providing a capability to assemble releasably the joining member with the base; a locking mechanism adapted to lock the base and the joining member in a mounted position relatively to each other; the base comprising a mounting element adapted to mount the base to the surface; and the joining member comprising a joint element adapted to mount the electric light fixture to the joining member.

19 Claims, 9 Drawing Sheets

(51) Int. Cl.
  *F21V 17/02* (2006.01)
  *F21S 8/00* (2006.01)
  *F21V 21/02* (2006.01)
  *F21W 131/10* (2006.01)
  *F21V 23/04* (2006.01)
  *F21S 9/03* (2006.01)
  *H01R 33/72* (2006.01)
  *H01R 13/627* (2006.01)

(52) U.S. Cl.
  CPC ............... *F21V 23/06* (2013.01); *F21S 9/032* (2013.01); *F21V 23/0471* (2013.01); *F21W 2131/10* (2013.01); *H01R 13/6272* (2013.01); *H01R 33/72* (2013.01)

(58) Field of Classification Search
  CPC ............ H01L 51/5088; H01L 51/5012; H01L 51/5206; H01L 51/5265; H01L 2251/301; H01L 2251/308; H01L 2251/5315; H01L 51/5262; C22C 5/08; C22C 5/06; F21V 21/30; F21V 21/02; F21V 17/02; F21V 23/06; F21V 23/0471; F21S 8/033; F21S 9/032; H01R 13/6272; H01R 33/72; F21W 2131/10
  See application file for complete search history.

(56) References Cited

U.S. PATENT DOCUMENTS

| | | | |
|---|---|---|---|
| 6,322,234 | B1 | 11/2001 | Drake et al. |
| 6,502,975 | B1* | 1/2003 | Branstetter ........... F21S 48/215 362/366 |
| 6,780,049 | B1* | 8/2004 | D'Angelo ........... F04D 29/601 439/313 |
| 2001/0033487 | A1* | 10/2001 | Crelin ...................... F21S 8/033 362/147 |
| 2002/0182917 | A1* | 12/2002 | Kerr, Jr. .................. F21V 21/02 439/314 |
| 2003/0148649 | A1* | 8/2003 | Kerr, Jr. .................. F21V 21/02 439/332 |
| 2003/0161160 | A1* | 8/2003 | Caluori .................. F21S 8/02 362/404 |
| 2012/0002427 | A1 | 1/2012 | Moon et al. |
| 2012/0106181 | A1* | 5/2012 | DeRouin .............. B60Q 1/0088 362/487 |
| 2017/0314741 | A1* | 11/2017 | Gleeson .................. F21K 9/272 |
| 2019/0092225 | A1* | 3/2019 | Schermerhorn ......... B60Q 1/24 |

FOREIGN PATENT DOCUMENTS

| | | |
|---|---|---|
| FR | 2949535 | 1/2014 |
| JP | 3056129 | 6/2000 |
| JP | 2012015075 A * | 1/2012 |
| JP | 2015125976 | 7/2015 |

* cited by examiner

EXTERIOR LAMP MOUNTING ADAPTOR WITH INTEGRATED ELECTRICAL INTERFACE

BACKGROUND

(a) Field

The subject matter disclosed generally relates to lights and fixtures. More particularly, the subject matter disclosed relates to wall mounted light fixtures.

(b) Related Prior Art

In the field of light fixtures, and particularly wall mounted light fixtures and ceiling mounted light fixtures, there have been development over the years to simplify the installation of light fixtures on walls and ceilings. Improvements were made in the electrical light box configurations used to mount the light fixtures, plates and components used between the electrical connection box and the light fixture to simplify installation of the light fixture, as well as other solutions to allow a wider range of adjustments of the light fixture.

Some attempts did simplify the installation of light fixtures. However, there are still outstanding difficulties existing in installing light fixtures.

There is therefore a need for improvement in methods and solutions to mount light fixtures on walls, ceilings or other surfaces that overcome the drawbacks of existing solutions.

SUMMARY

According to an embodiment, there is described a mounting adaptor for an electric light fixture to be mounted on a surface, the mounting adaptor comprising: a base and a joining member on which is mounted the electric light fixture, the base and the joining member each having an interfacing face, one of the base and the joining member comprising on its interfacing face a groove, the other one of the base and the joining member comprising on its interfacing face a lip adapted to cooperate with the groove thereby providing a capability to assemble releasably the joining member with the base; wherein the base comprises a mounting element adapted to mount the base to the surface; and wherein each one of the interfacing faces comprises an electrical interface for electrical coupling with the electrical interface of the other one of the interfacing faces when assembling the base and the joining member.

According to an aspect, each one of the electrical interfaces comprises one of an electric plug and an electric socket.

According to an aspect, the interfacing faces operate along an interfacing plane, and wherein the electric plug and the electric socket extend along axes which are parallel to the interfacing plane.

According to an aspect, the electric plug is color-coded.

According to an aspect, one of the interfacing faces comprises a lower portion, an elevated portion and a wall joining the lower portion to the elevated portion, and wherein one of the electrical interface is located on the wall.

According to an aspect, the electric plug extends from the wall.

According to an aspect, one of the electrical interface comprises a recess and the other of the electrical interface comprises a protruding foot to be coupled to the recess.

According to an aspect, one of the interfacing faces comprises a lower portion and an elevated portion, and wherein the mounting adaptor comprises a protruding extension for abutting the joining member.

According to an aspect, the one of the interfacing faces comprises a wall joining the lower portion to the elevated portion, and wherein the protruding extension extends from one of the lower portion, the wall and the elevated portion.

According to an aspect, the mounting adaptor further comprises, a locking mechanism adapted to lock the base and the joining member in a mounted position relatively to each other.

According to an aspect, the locking mechanism comprises a resilient member, wherein the resilient member moves from an unlocked position to a locked position during an assembly of the joining member with the base.

According to an aspect, one of the base and the joining member comprises the resilient member comprising a protrusion, and the other one of the base and the joining member comprises a cavity, wherein the cavity receives the protrusion when the joining member is assembled with the base.

According to an aspect, the resilient member comprises a flange, wherein said flange is for unlocking the joining member from the base.

According to an aspect, the surface comprises an electrical connection box, the mounting adaptor further comprising an input electrical connection to be connected to the electrical connection box and to electrically connect to one of the electrical interfaces.

According to an aspect, the joining member further comprises a joint element which comprises a projection adapted to mount the electric light fixture to the joining member defining a pivot axis, wherein the electric light fixture is orientable about the pivot axis.

According to an embodiment, there is provided a mounting adaptor for an electric light fixture to be mounted on an electrical connection box, the mounting adaptor comprising: a base and a joining member adapted to be releasably assembled to each other; the base comprising: a mounting element adapted to mount the base to the electrical connection box; an input electrical connection electrically connecting the base to the electrical connection box; and a first electrical interface; the joining member comprising: a joint element adapted to mount mechanically the electric light fixture to the joining member; and a second electrical interface for electrical coupling to the first electrical interface to electrically connect the base to the electric light fixture, wherein the first electrical interface couples to the second electrical interface as the joining member is mounted to the base.

According to an aspect, one of the first electrical interface and second electrical interface comprises an electric plug and the other one the first electrical interface and second electrical interface comprises an electric socket, wherein the base and the joining member are electrically connected when the electric plug is connected to the electric socket.

According to an aspect, the base and the joining member are sled relatively to each other along an interfacing plane to be assembled releasably, and wherein the electric plug and the electric socket extends along an axis parallel to the interfacing plane.

According to an aspect, one of the base and the joining member comprises a lower portion, an elevated portion and wall joining the lower portion to the elevated portion, and wherein one of the first electrical interface and the second electrical interface is located on the wall.

According to an aspect, the base when mounted to the electrical connection box defines a cavity, wherein the input electrical connection further comprises an electric transformer, and wherein the electric transformer is housed within the cavity.

According to an embodiment, there is disclosed a mounting adaptor for an electric light fixture to be mounted on a surface. The mounting adaptor comprises a base and a joining member each having an interfacing face, one of the base and the joining member comprising on its interfacing face a groove, the other one of the base and the joining member comprising on its interfacing face a lip adapted to cooperate with the groove thereby providing a capability to assemble releasably the joining member with the base. The base comprises a mounting element adapted to mount the base to the surface. The joining member comprises a joint element adapted to mount the electric light fixture to the joining member.

According to an aspect, the mounting adaptor further comprises a locking mechanism adapted to lock the base and the joining member in a mounted position relatively to each other.

According to an aspect, the locking mechanism comprises a resilient member, wherein the resilient member moves from an unlocked position to a locked position during an assembly of the joining member with the base.

According to an aspect, one of the base and the joining member comprises the resilient member comprising a protrusion, and the other one of the base and the joining member comprises a cavity, wherein the cavity receives the protrusion when the joining member is assembled with the base.

According to an aspect, the resilient member comprises a flange, wherein said flange is for unlocking the joining member from the base.

According to an aspect, the resilient member is embedded in the base.

According to an aspect, the locking mechanism comprises a first opening, a second opening and an insertion component, wherein the first opening and the second opening provide a passage between the base and the joining member for the insertion component to fill when the joining member is assembled with the base.

According to an aspect, the groove comprises a pair of grooves which are linearly spaced apart.

According to an aspect, the pair of grooves are configured at an angle of between about ten (10) degrees and sixty (60) degrees relative to each other.

According to an aspect, the one of the base and the joining member that comprises the pair of grooves comprises a top wall, wherein the pair of grooves end at the top wall.

According to an aspect, the pair of grooves have an entry end and a mounted end, and wherein a distance between the pair of grooves at the entry end is greater than a distance at the mounted end.

According to an aspect, the grooves are symmetric relatively to a mounting axis, and the mounting axis is substantially vertical.

According to an aspect, the surface comprises an electrical connection box, and the mounting adaptor further comprises an input electrical connection to be connected to the electrical connection box and an output electrical connection connected to the input electrical connection for connecting to the electric light fixture.

According to an aspect, the mounting adaptor further comprises an electrical cable connecting the input electrical connection to the output electrical connection.

According to an aspect, the input electrical connection comprises an electric transformer.

According to an aspect, the joint element comprises a projection adapted to mount the electric light fixture to the joining member defining a pivot axis, wherein the light fixture is orientable about the pivot axis.

According to an embodiment, there is disclosed a mounting adaptor for an electric light fixture to be mounted on an electrical connection box. The mounting adaptor comprises a base and a joining member adapted to be releasably assembled to each other. The base comprises a mounting element adapted to mount the base to the electrical connection box. The joining member comprises a joint element adapted to mount mechanically the electric light fixture to the joining member to be electrically connected to the electric light fixture. The mounting adaptor also comprises an input electrical connection to be connected to the electrical connection box through the base, and an output electrical connection residing outside of the base and connected to the input electrical connection for electrically connecting to the joining member when the base and the joining member are assembled.

According to an aspect, one of the base and the joining member comprises an electric plug and the other one of the base and the joining member comprises a socket, wherein the base and the joining member are electrically connected when the electric plug is connected to the socket.

According to an aspect, the input electrical connection is connected to one of the electric plug and the socket, and wherein the output electrical connection is connected to the other one of the electric plug and the socket.

According to an aspect, the base when mounted to the electrical connection box defines a cavity, with the input electrical connection further comprising an electric transformer that is housed within the cavity.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
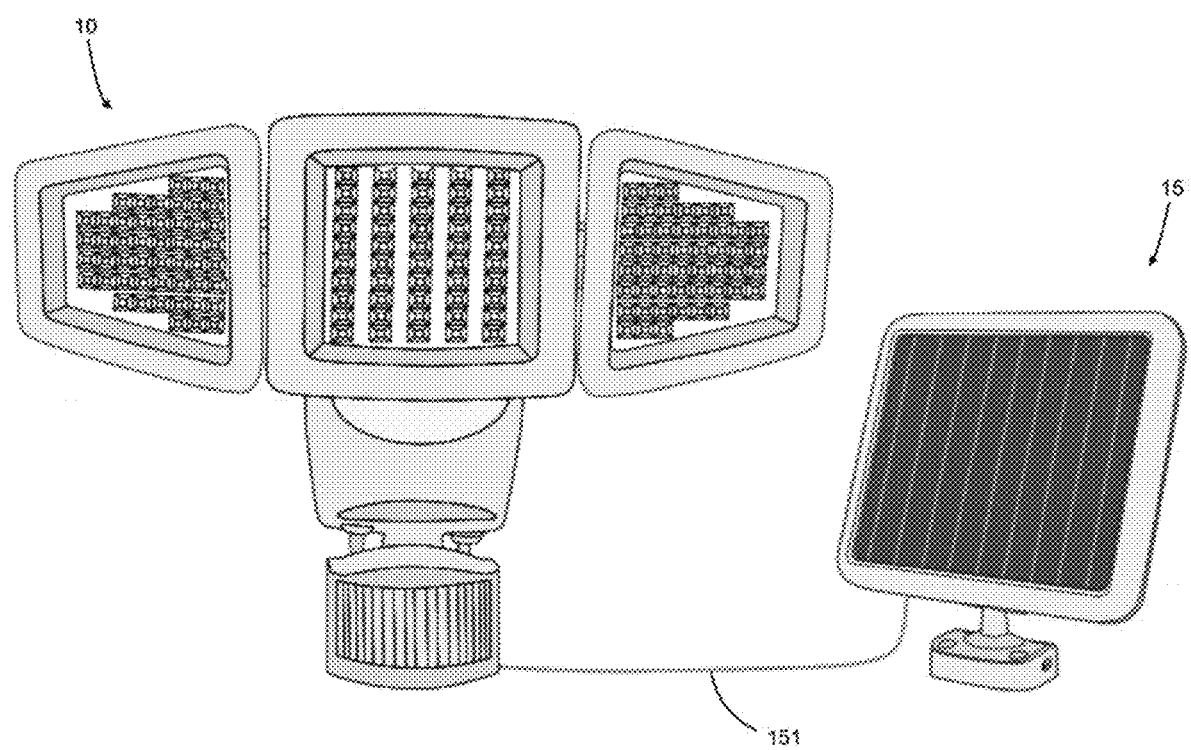
FIG. 1 is a schematic perspective view of a light fixture powered by a solar panel in accordance with an embodiment.

Referring now to the drawings, and more particularly to FIG. 1, there is shown a schematic perspective view of a light fixture 10 powered by a solar panel 15 before installation. FIG. 1 shows a solar panel power line 151 connecting the solar panel 15 to the light fixture 10 and providing power to the light fixture 10.

Figure 2:
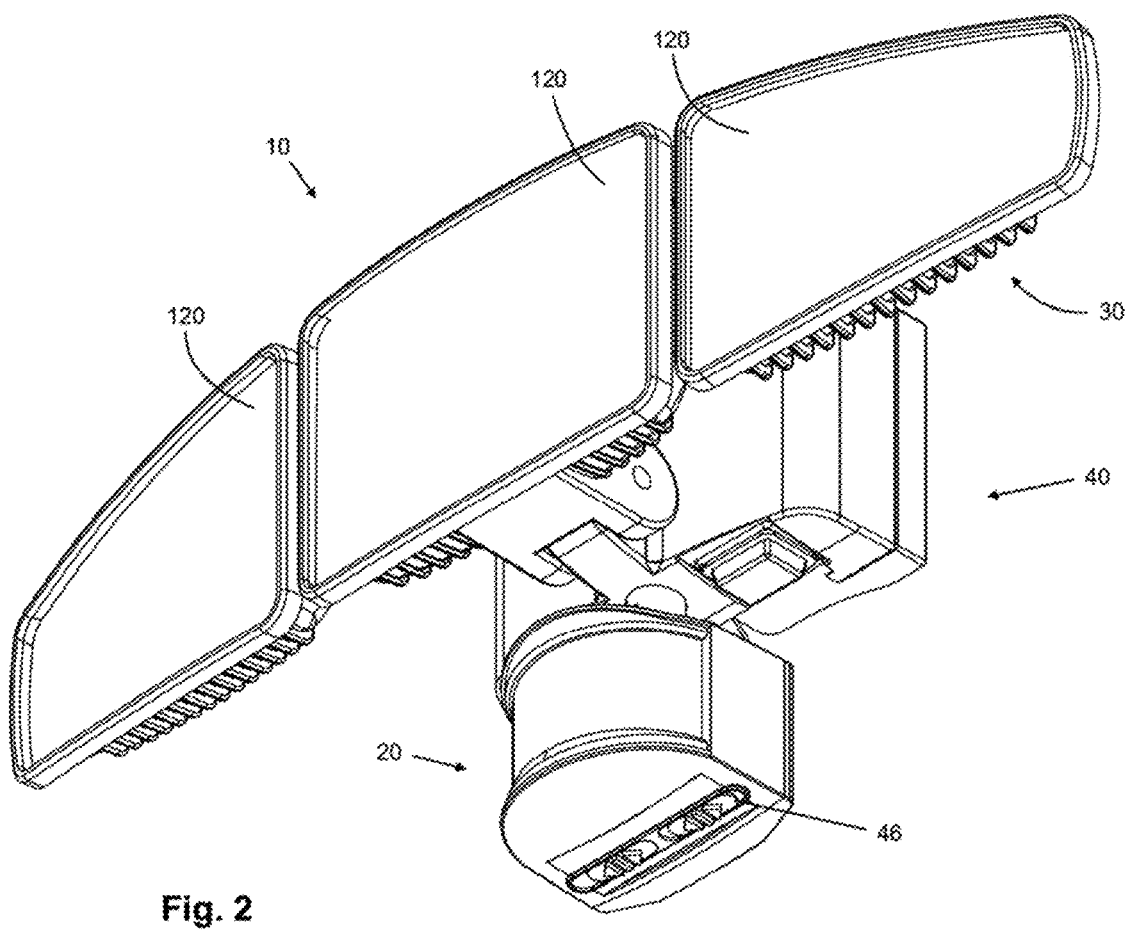
FIG. 2 is a bottom perspective view of a light fixture in accordance with an embodiment.

Now referring to FIG. 2, there is shown a perspective view of the electric light fixture 10, a.k.a. a wall-mounted exterior lamp 10, according to an embodiment. The exterior lamp 10 illustrated is intended to be mounted on a wall (not illustrated). The exterior lamp 10 illustrated may be intended to be powered by a solar panel 15 (see FIG. 1) or through the use of a conventional electrical connection box (see FIG. 6) connected to the house or other building electrical circuit.

The exterior lamp 10 of the illustrated embodiment comprises a motion sensor component 20 and a light panel assembly 30 having one or more light emitting components 120 pivotally mounted thereon. Accordingly, the exterior lamp 10 is well adapted to be mounted on exterior walls close to entrances and exits, close to windows and areas to be lit when movement is detected in the vicinity thereof. The exterior lamp 10 further comprises a body assembly 40 through which the motion sensor component 20 and the light panel assembly 30 are coupled to the electrical power and through which the whole exterior lamp 10 is mounted on the wall.

Figure 3:
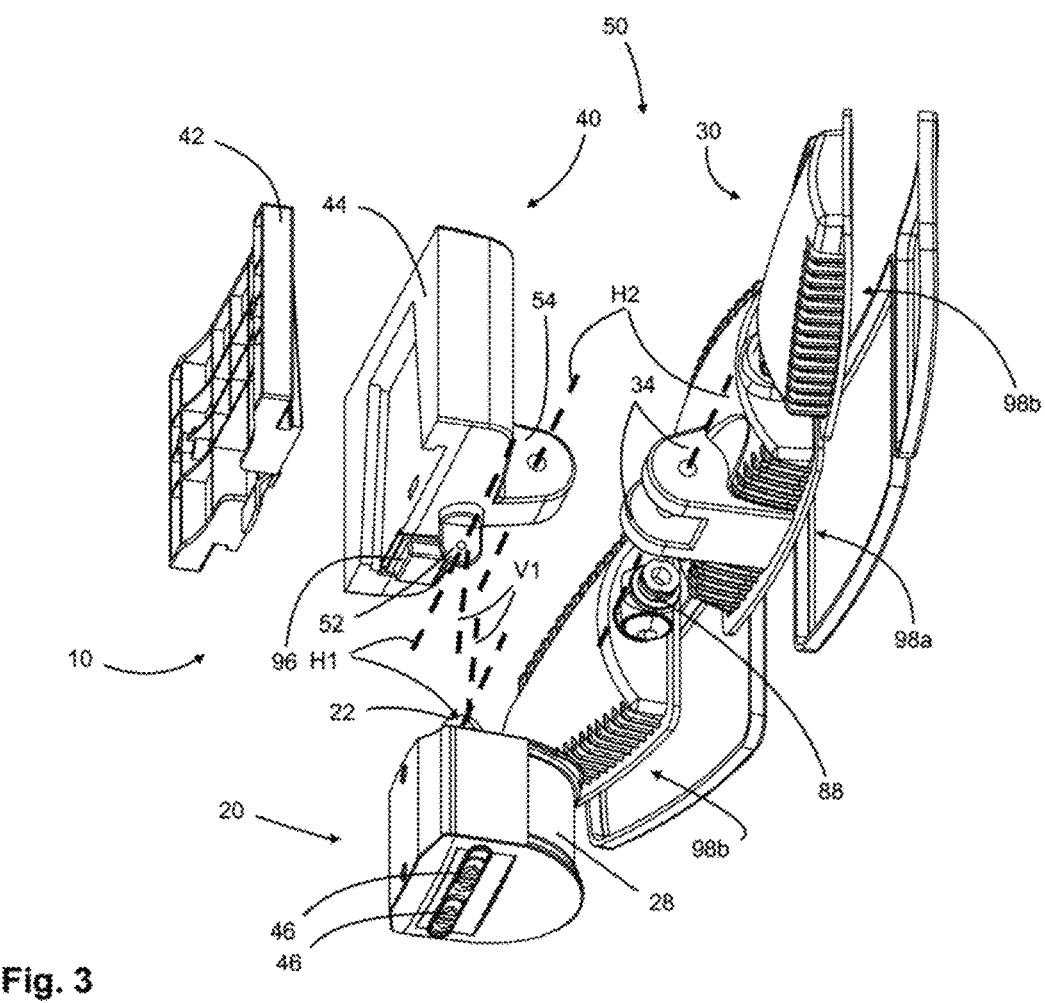
FIG. 3 is a bottom exploded perspective view of the light fixture of FIG. 2.

Now referring additionally to FIG. 3, there is illustrated an exploded bottom view of the exterior lamp 10 according to a first embodiment wherein the power source feeding the exterior lamp with power consists in a solar panel (see FIG. 1). The exterior lamp 10 comprises a body assembly 40 having a front face and a back face according to which the body assembly 40 can be mounted to a wall (vertical or sloped) or a ceiling. The body assembly 40 comprises two complementary mounting components: a base 42 and a joining member 44. The joining member 44 features elements for the motion sensor component 20, comprising a motion sensing area 28, and the light panel assembly 30 to be mounted thereto. During the installation of the exterior lamp 10, the joining member 44 and the components attached to the joining member 44, namely the motion sensor component 20 and the light panel assembly 30, form together an exterior light sub-assembly 50 that may be handled as a single component during that operation.

The motion sensor component 20 is mounted on the joining member 44. It is mounted in a pivotal manner through an articulated coupling sub-assembly comprising a top coupling projection 22 coupled to a bottom projection 52 located on the joining member 44. This articulated coupling sub-assembly allows the motion sensor component 20 to pivot around a first horizontal pivot axis H1 and an angular vertical axis V1. The pivoting of the motion sensor component 20 is for adjusting an angle of the motion sensor component 20 relative to the horizontal and vertical plane. This feature is useful to aim the motion sensor component 20 in any direction between the horizontal and at an angle aiming toward the ground below in front of the level of the exterior lamp 10. It is also for aiming the motion sensor component 20 on either side of the mounting surface normal axis. Controls 46 located on the bottom side of the motion sensor component 20 allow setting configurations to the motion sensor component 20. One of the controls 46 is for setting the sensitivity of the motion sensor component 20. One of the controls 46 is for setting the detection range of the motion sensor component 20. The motion sensor component 20 further comprises an electrical connection (not shown) through which the motion sensor component 20 is powered and connected to the light panel assembly 30. A light switch 96 capable of taking three settings, an ON setting, an OFF setting and an AUTOMATIC setting. The light switch 96 is mounted on the joining member 44 and, as the motion sensor component 20, controls when the exterior light 10 is lit and when it is not.

The electrical configuration of the exterior lamp 10 (not illustrated) comprises electrical connections that connect at least the joining member 44, the motion sensor component 20 and light panel assembly 30, since all these components are or comprise powered components. These electrical connections may consist in exterior wires connecting two different components (e.g. a wire or cable connecting the joining member 44 to the motion sensor component 20) or may consist in wires embedded in the physical connection elements joining together components (e.g. light joints, see FIG. 3). Exterior wires may comprise a combination of electric plug and socket to allow easy connection/disconnection of the components. The electrical connections, once connected, electrically connect the light units 98 of the light panel assembly 30 to its power source and all of its control components.

The joining member 44, as stated, comprises a bottom projection 52 on which is mounted the motion sensor component 20 through the top coupling projection 22 for the mounting thereof.

The joining member 44 further comprises a front projection 54 extending in the opposite direction from its interfacing face, namely the back wall 69 (see FIG. 4) that faces the base 42. On front projection 54 is mounted in a pivotal manner the light panel assembly 30. The front projection 54 is adapted to be housed between two back coupling projections 34 such that the light panel assembly 30 is mounted on the joining member 44 and is able to rotate around a second horizontal pivot axis H2 to aim light emitted by the central light unit 98a located at the center (and accordingly the side light units 98b) at a desired angle relative to the horizontal plane, substantially in some proportion toward the ground or any other intended direction. Front projection 54 is an example of a joint element which is used to attach the light fixture 10 to the joining member 44.

The light panel assembly 30 comprises light joints 88 that joint the three light units 98 into a single light panel assembly 30. The light joints 88 physically holds the side light units 98b onto the central light unit 98a, as allow to adjust the orientation of the side light units 98b relatively to the angle aimed by the central light unit 98a relatively to the horizontal, as well as to aim farther or closer to center relatively into a vertical plane. The light joints 88 feature a passage for a wire to connect the side light units 98b to the central light unit 98a.

Figure 4:
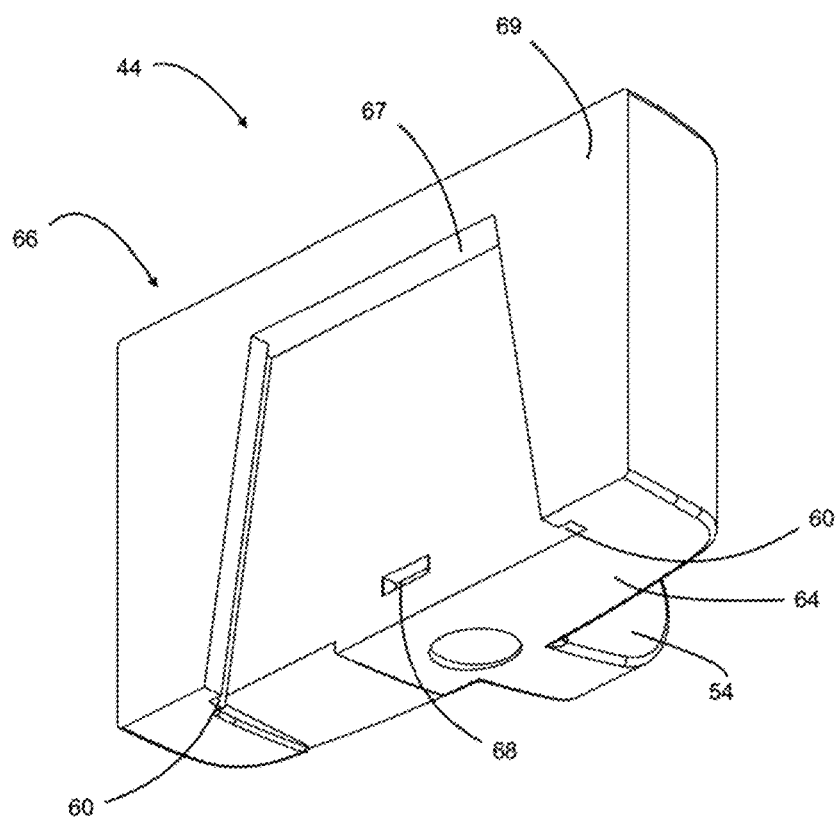
FIG. 4 is bottom perspective view of a joining member in accordance with an embodiment.

Now referring to FIG. 4, the joining member 44 comprises on its interfacing face a pair of spaced apart grooves 60 extending upwardly from, at their entry end, the bottom side 64 of the joining member 44 toward the top side 66 of the joining member 44, ending at their mounted end, with the top wall 67. According to an embodiment, the grooves 60 extend in a non-parallel manner, where the distance separating the grooves 60 diminishes as the vertical elevation increases or, in other words, as the grooves 60 get closer to their mounted end, close to the top wall 67. The space defined by the grooves 60 and the top wall 67 defining a cavity in the interfacing face of the joining member 44 relatively the general surface of the back wall 69 of the joining member 44.

It is to be noted that, according to other embodiments, the joining member 44 comprises an interior power compartment storing a rechargeable energy source, such as one or more batteries. The interior power compartment is electrically connected to the electrical connections of the exterior lamp 10. A releasable gate (not illustrated), hiding in default conditions the interior power compartment, allows, upon opening, reaching the batteries located in the interior power compartment for maintenance. That releasable gate could be located, for example, on the face cavity defined by defined by the grooves 60 and the top wall 67 thus and having the gate mostly secured from weather conditions. Alternative locations for the releasable gate comprise any of the exterior side faces of the joining member 44, and on the bottom face 64 of the joining member 44.

Figure 5:
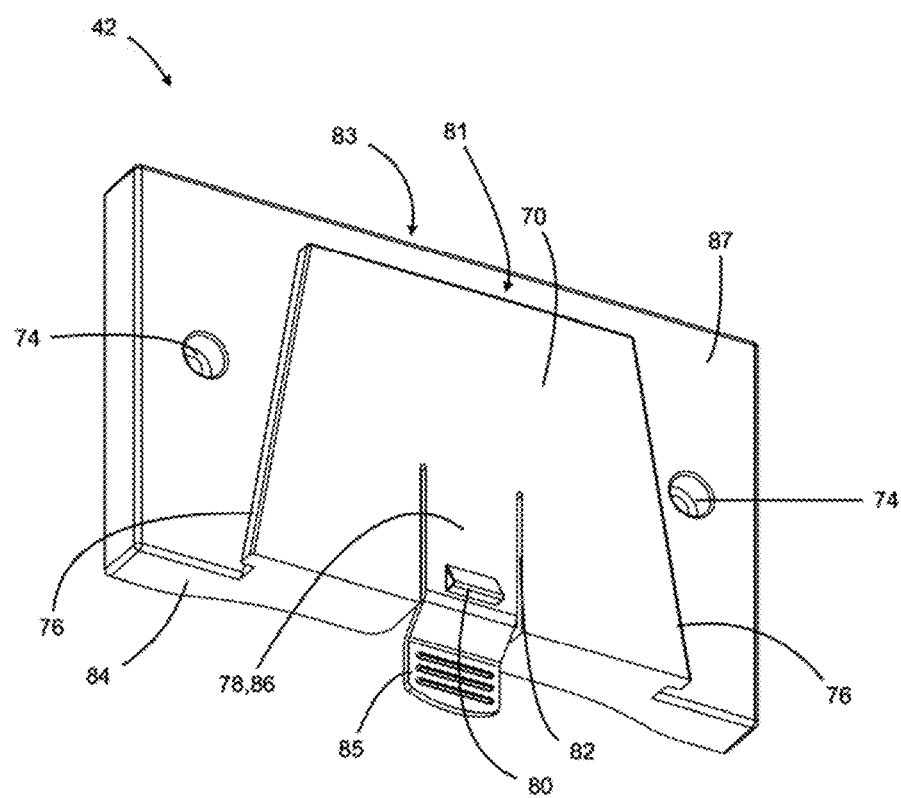
FIG. 5 is bottom perspective view of a base in accordance with an embodiment.

Now additionally referring to FIG. 5, the body assembly 40 also comprises a base 42 cooperating with the joining member 44. Referring particularly to FIG. 5, the base 42 comprises an interfacing face, identified as a front face 70, and an opposite face, namely a back face 72. The back face 72 of the base 42 is a mounting face adapted for mounting the base 42 on a surface, such as a wall or ceiling of the house or building.

Still referring to FIG. 5, the base 42 comprises holes 74 for fastening the base 42 to the wall or ceiling (i.e., the surface) using screws. Holes 74 are an example of a mounting element. Other examples of a mounting element include, but are not limited to, a bracket, a hanger, a brace, a hook, a closed or open slit, a closed or open slot, etc. Furthermore, the shapes and number of holes 74 (or mounting elements) are not limited to those shown in FIG. 5. Other shapes are envisaged and the number of mounting elements can be one, two or more.

The base 42 also comprises a pair of lips 76 upwardly extending from the bottom face 84 of the base 42 up to a top wall 81 located below the top face 83 of the base 42. The lips 76 are configured to cooperate with the grooves 60 located on the joining member 44, namely the lips 76 and grooves 60 have complementary shapes and spacing such that they slide one about the other and therefore perform an assembling function of the joining member 44 to the base 42.

The base 42 also comprises a flap 78 extending downwardly over a portion of the height of the base 42 and separated on both sides over a portion of its length from the front face 70 of the base 42 by two cuts 82; the flap 78 thereby defines a resilient member free to move back and moving back forth between a locked position and an unlocked position. Further, a protrusion 80 is located on the front face 86 of the flap 78 distant from the junction of the flap 78 to the front face 70. Upon mounting of the base 42 and the joining member 44 together, the flap 78 is biased to have its protrusion 80 aligned with a location a cavity 68 to receive the protrusion 80. Thus, the combination of flap 78 comprising a protrusion 80 and the cavity in complementary mounting components, namely the base 42 and the joining member 44, define a resilient locking mechanism operating on the front face of the base 42, or in a broader manner on the interfacing faces of the body assembly 40. In the locked position, the locking mechanism hinders unintentional dismounting of the joining member 44 relative to the base 42.

The flap 78 comprises an unlocking flange 85 for pushing the flap 78 away from the joining member 44. Thus, when the flange 85 is pushed, away, the protrusion 80 is not inside the cavity 68 and therefore the body assembly 40 is in a mounted position while it is not in a locked condition (i.e., in an unlocked position). It allows to slide up the joining member 44 relatively to the base 42 to dismount the exterior light sub-assembly 50 from the base 42.

The base 42 features thereby an interfacing face comprising a front face 70 having an elevated portion (defined by the space between the lips 76, the top wall 81 and the bottom face 84) and a lower portion 87 substantially surrounding the elevated portion, with the topography of the interfacing face of the base 42 substantially matching the topography of the interfacing face of the joining member 44.

This embodiment features having the lips 76 and the grooves 60 forming a parallelogram having a narrow top and a broad base. That shape has the advantage of having gravity helping the assembly of the joining member 44 on the base 42 by sliding down the joining member 44 relative to the base 42 until the end of the available sliding course.

It is to be noted that the pair of grooves 60 are disposed the same angle relatively to a mounting axis (not illustrated) that typically refers as the vertical axis. Sliding of the joining member 44 is performed substantially following that mounting axis when mounting the joining member 44 to the base 42.

In alternative embodiments, the angle between the lips 76 and the grooves 60 may be about ten (10) degrees. In alternative embodiments, the angle between the lips 76 and the grooves 60 be more or less than about ten (10) degrees.

According to an alternative embodiment, the grooves 60 extend to the top surface 66 of the joining member 44. Thus, the course of the joining member 44 relatively to the base 42 is limited solely by the distance between the lips 76 reaching the distance between the grooves 60 rather than by of the top wall 81 contacting the top wall 67.

According to another embodiment, the base 42 and the joining member 44 comprise openings (a first and a second opening not illustrated) that, when in a mounted position relatively to each other (e.g. when the top wall 81 contacting the top wall 67), are aligned to define a passage. Thus, an insertion component (not illustrated), such as a key, a screw, a cylindrical, etc. may be inserted in the passage to lock the base 42 and the joining member 44 in a mounted position.

Figure 6:
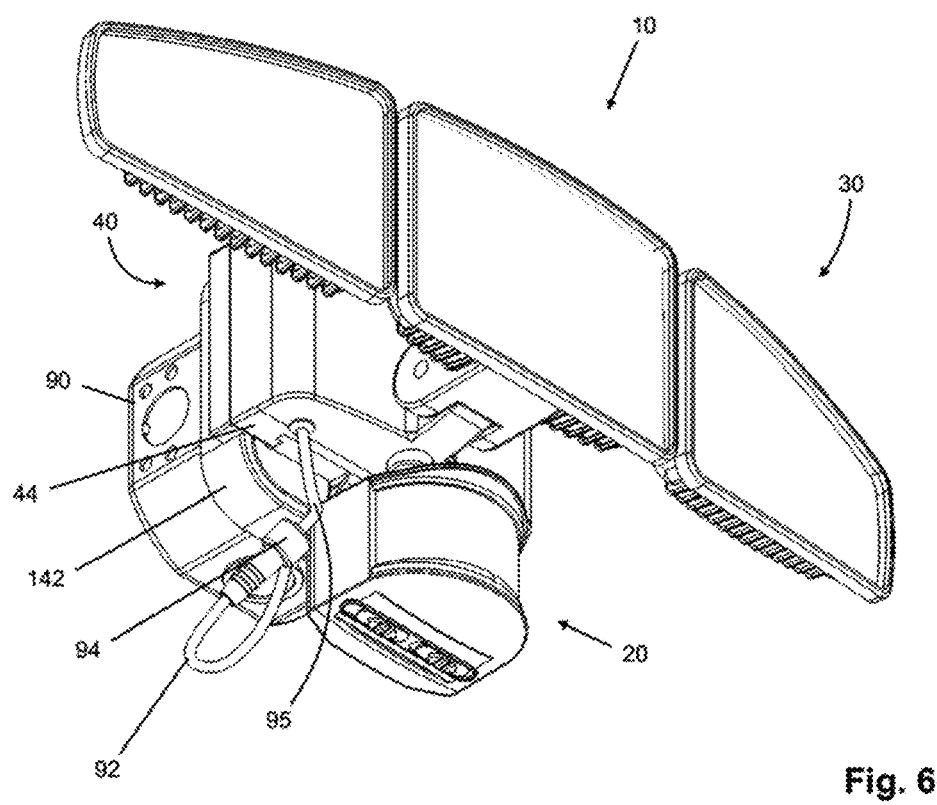
FIG. 6 is a bottom perspective view of an electrically connected light fixture mounted on an electrical connection box in accordance with another embodiment.
Figure 7B:
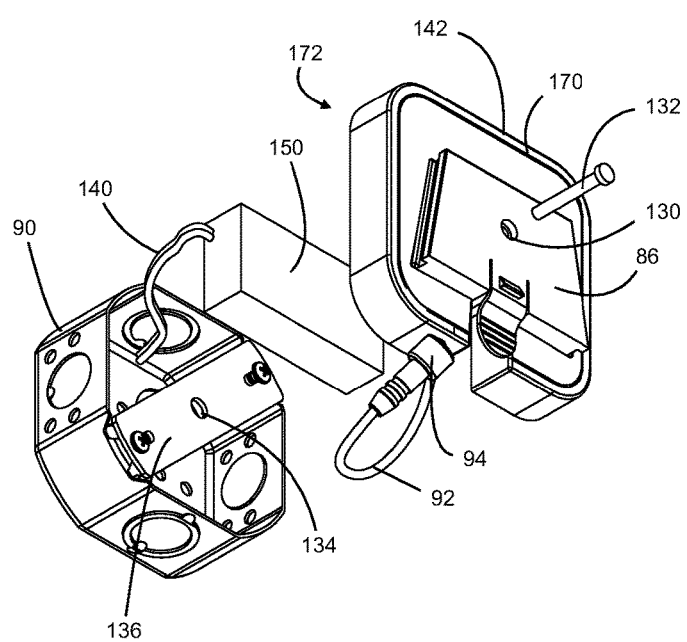
FIGS. 7A and 7B are a bottom perspective view and an exploded bottom perspective view of a base mounted on an electrical connection box in accordance with the embodiment of FIG. 6.
Figure 7A:
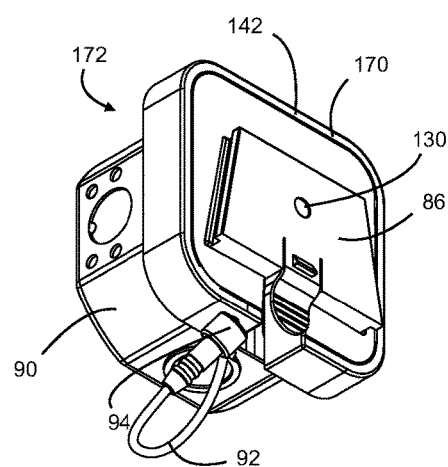

Now referring to FIGS. 6, 7A and 7B, according to another embodiment, an assembled view of the exterior lamp 10 mounted to an electrical connection box, typically located in a wall or ceiling, is provided. As illustrated, the base 142 features an electrical cable 92 connecting the joining member 44 to the base 142. The electrical cable 92 exits from the bottom face of the base 142 and connects to the joining member 44.

Referring particularly to FIGS. 7A and 7B, the base 142 comprises a front face 170 and a back face 172 mounted on the electrical connection box 90. The electrical connection between the base 142 and the electrical connection box 90 defines an input electrical connection connecting the power source to the base 142. The input electrical connection comprises electrical wires 140 or poles to be connected to the electrical connection box wires, and an electric transformer 150 transforming the house current into exterior lamp 10 usable current, the electric transformer 150 connected to the base by wire elements that may comprise for instance plug and socket for easy installation.

In an embodiment, an electric transformer 150 for transforms the grid-fed alternative current (AC) into direct current (DC).

Still referring to FIGS. 7a and 7B, the electric transformer 150 (not shown in real scale) takes place in the space defined by between the back face 172 of the base 142 and its front face 170 (i.e. inside the base 142). The electrical connection box 90 may take place in the electrical connection box 90 in the space back to the face plate 136, in front of the face plate 136, or aside the face plate 136.

The electrical connection components may comprise a combination of an electrical cable 92 having a connection end 94 of a plug type to be connected to a socket connected to the joining member 44 by an electrical cable 95. The electrical cable 92 and the connection end 94 defining an output electrical connection component to connect to the joining member 44. The electrical cable 92 is connected to the electric transformer 150 within the back face 172 and the front face 170 of the base 142.

Figure 9B:
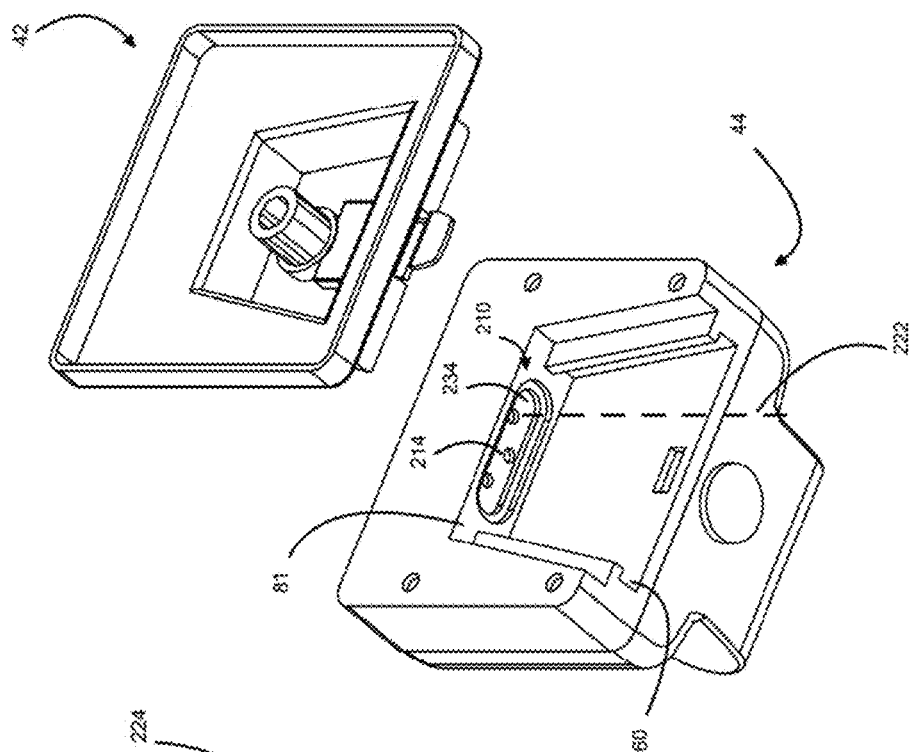
FIGS. 9A-B are exploded perspective front and back views of a base and a joining component of a light fixture according to another embodiment.
Figure 9A:
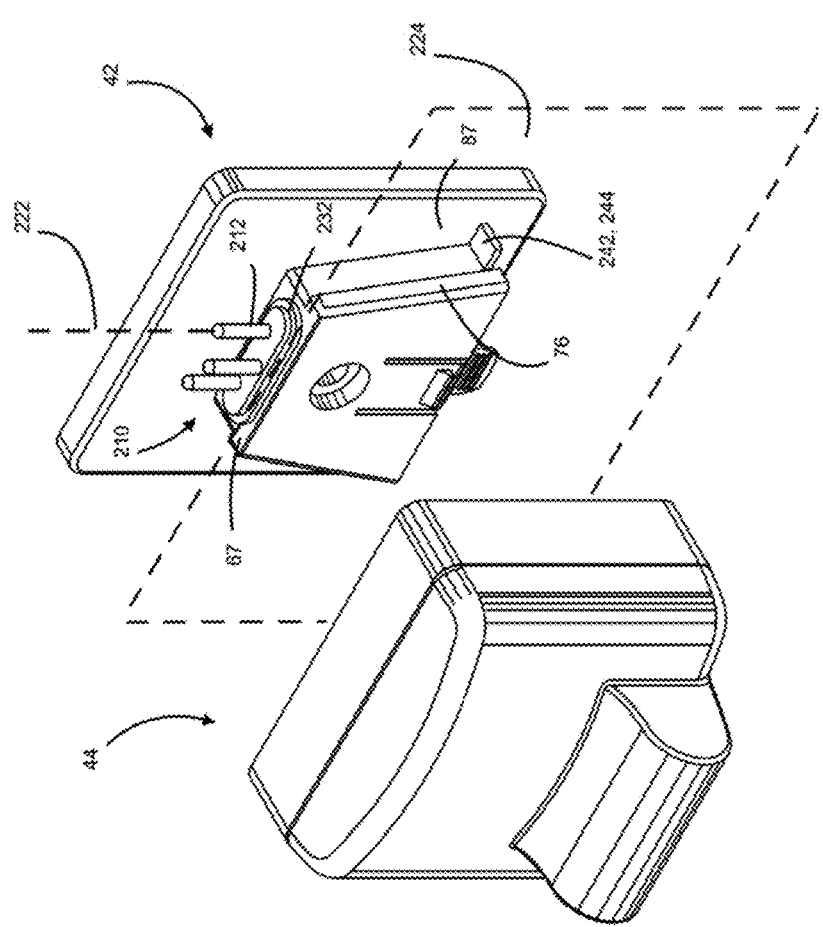

Referring now to FIGS. 9A-B, the top walls 67 and 81 of the base 42 and the joining member 44 comprises a releasable electrical interface 210. The electrical interface 210 comprises a plurality of protruding plugs 212 and cooperative sockets 214 in which slide the plugs 212 when the mounting the joining member 44 to the base 42. The plugs 212 once sled in place ensure electrical connection between the joining member 44 and the grid. The protruding plugs 212 are extending straight from the top wall 67, following the general mounting orientation of the jointing member 44 to the base 42, respecting and furthermore ensuring appropriate movement of the joining member 44 relative to the base 42 upon mounting. Thus, the plugs 212 and the sockets 214 are oriented along axis 222 parallel to the mounting interfacing plane 224 along which the base 42 and the joining member 44 are mounted together.

According to an embodiment, the number of plugs 212 and accordingly of cooperative sockets 214 is three (3). The number of plugs 212 is determined by the grid characteristics, and normally connects the plugs 212 to a live wire, a neutral wire and a ground wire of the grid. According to an embodiment, the plugs 212 are color-coded (not shown), using standard color coding, or pattern-coded, to indicate the corresponding wire to which they are connected.

According to an embodiment, the top walls 67 and 81 further comprises a protruding foot 232 at the base of the plugs 212 and a foot-receiving recess 234 matching the shape of the protruding foot 232. When sliding the joining member 44 in place, the cooperation of the foot 232 and recess 234 ensure alignment of the mounting components in complementarily to the grooves 60 and lips 76. The protruding foot 232 can also receive a sealing gasket to weather proof the connection.

Still referring to FIGS. 9A-B, the base 42 further comprises an horizontally protruding extension 242 preventing over sliding of the joining member 44 upon mounting to the base 42. The horizontally protruding extension 242 extends outwardly and horizontally close to the base of the lips 76, abutting the bottom face 64 of the joining member 44 once mounted thereto. According to embodiments, the extension 242 is present about one or both lips 76. According to embodiments, the extension 242 comprises an abutting wall 244 extending outwardly and horizontally. According to an embodiment, the extension 242 extends outwardly close from the lip 76. According to another embodiment, the extension 242 extends forwardly from the lower portion 87 of the base 42, either close or distant from the elevated portion. According to another embodiment, the extension 242 extends forwardly from the elevated portion of the base 42.

According to embodiments, the different electrical connections may be embodied as keyed connector types, socketed connector types, with water-tight type of insulation, or any other type of electrical cable connector with or without a locking mechanism preventing the electrical connection from being interrupted by accident.

According to an alternative embodiment, electrical connections between the base 142 and the joining member 44 are performed by contact spots (not shown) located on the interfacing faces of the two complementary mounting components. When the complementary mounting components in a mounted position, the contact spots would be aligned to corresponding ones on the complementary mounting component, allowing the power to be exchanged between the contact spots. Examples of locations for the contact spots would be spots on both sides of the flap 78 for the neutral connection, and a spot located on the top wall 81 on the base 42 for the live power connection. The contact spots on the joining member 44 would be aligned based on the intended mounted position of the two complementary mounting components.

The base 142 further comprises a hole 130 adapted to receive a screw 132 used mount the base 142 to the face plate 136 of the electrical connection box 90 in which the screw 132 is adapted to be secures in the fileted hole 134. The shapes and dimensions of the screw 132, the electric transformer 150 and the back face 72 of the base 142 are for mounting the base 142 while housing the electric transformer 150 in the space available.

Figure 8A:
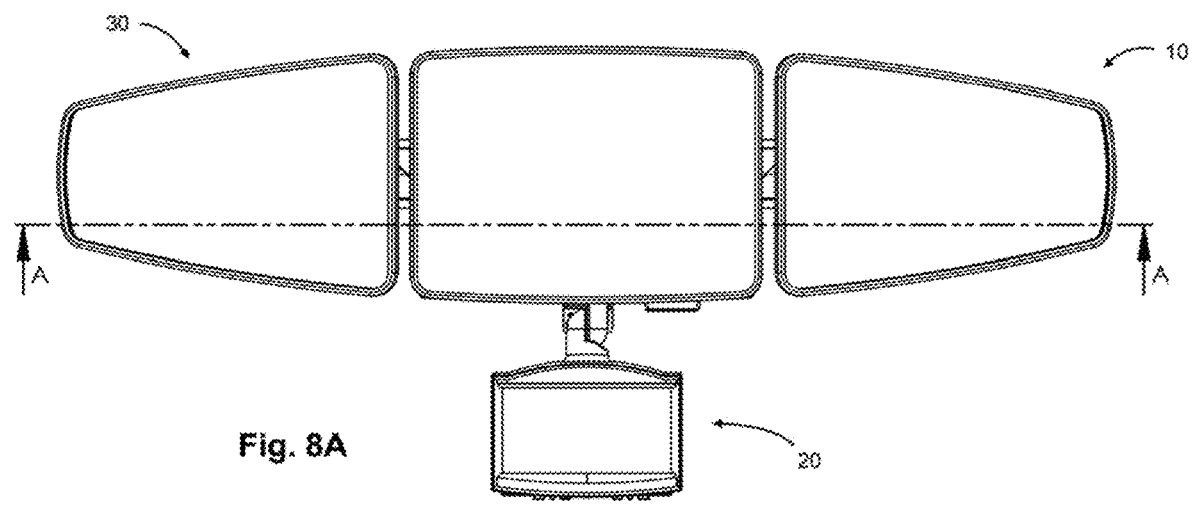
FIG. 8A is front view of a light fixture in accordance with the embodiment of FIGS. 6, 7A and 7B.

Now referring additionally to FIG. 8A, that still refers to the same embodiment as FIG. 6, the exterior lamp 10 is shown according to a front view with a horizontal cut line A-A identified.

Figure 8B:
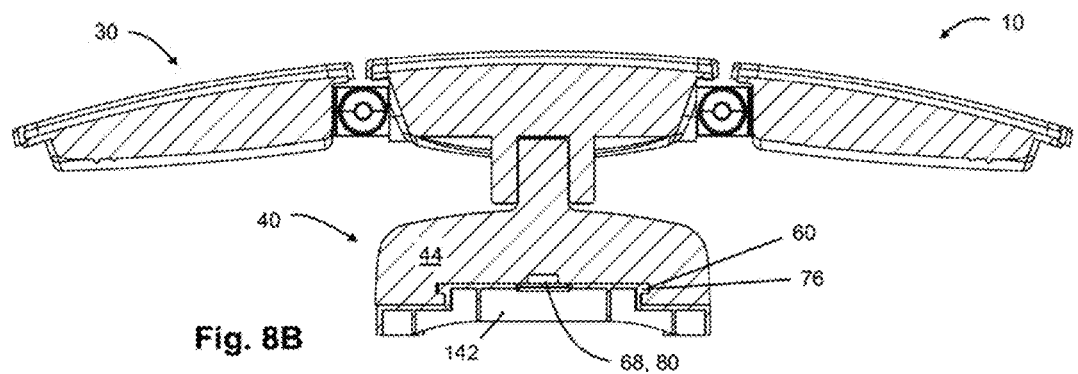
FIG. 8B is cut out bottom view of the light fixture of FIG. 8A taken along line A-A.

Now referring to FIG. 8B, the bottom view of the cut of the exterior lamp 10 plainly shows the complementary mounting components, namely, the base 142 and the joining member 44, assembled. The grooves 60 form a cavity in which takes place the elevation of the base 142. It defines a cooperation allowing only vertical movement (perpendicular to the plane defined by the cut) of the joining member 44 relatively to the base 142.

According to an embodiment such as illustrated on FIGS. 1 to 5, the installation of the exterior lamp 10 include the step of mounting the solar panel 15 on the house of house or building. It further comprises the step of passing the solar panel power line 151 to power the exterior lamp 10 from the solar panel 15 from the solar panel 15 to the location the exterior lamp 10 will be mounted.

It further comprises the step of mounting the base 42 to the receiving surface, namely a wall or a ceiling of the house or building. The mounting of the base 42 may comprise the use of fastening material such as screws.

The steps further comprise assembling the remaining components of the exterior lamp 10, namely the exterior light sub-assembly 50, as a single unit that can be handled. According to different embodiments, the components to assemble comprise the joining member 44 and at least one of motion sensor component 20 and the light panel assembly 30. According to an embodiment, the step of assembling the components of the exterior lamp 10 further comprises verifying that the motion sensor component 20 and the light panel assembly 30 are well mounted on the joining member 44.

The steps further comprise aligning the grooves 60 and complementary shaped lips 76 in a mounting position and sliding down the joining member 44, thus the exterior light sub-assembly 50, in place along the mounting grooves 60 on the base 42. At the end of the sliding course, the joining member 44 reaches a position where it is automatically locked in a mounted position by the resilient locking mechanism comprising the flap 78 and the protrusion 80.

The steps further comprise electrically coupling exterior lamp 10 with the power source, namely the solar panel 15. Accordingly, the step comprises plugging the end of the solar panel power line 151 into the appropriate socket 94, usually located on the joining member 44.

The steps further comprise adjusting the exterior lamp, comprising at any one of setting the controls, adjusting the aiming direction of the motion sensor component 20, and adjusting the aiming direction of the different light units 98.

According to another embodiment such as particularly illustrated on FIGS. 6, 7A and 7B, the installation of the exterior lamp 10 comprises electrically connecting the input electrical connection to the house or building power grid in the electrical connection box 90.

It further comprises the step of line the mounting the base 142 to the electrical connection box 90.

The steps further comprise assembling the remaining components of the exterior lamp 10, namely the exterior light sub-assembly 50, as a single unit that can be handled. According to different embodiments, the components to assemble comprise the joining member 44 and at least one of motion sensor component 20 and the light panel assembly 30. According to an embodiment, the step of assembling the components of the exterior lamp 10 further comprises verifying that the motion sensor component 20 and the light panel assembly 30 are well mounted on the joining member 44.

The steps further comprise aligning the grooves 60 and complementary shaped lips 76 in a mounting position and sliding down the joining member 44, thus the exterior light sub-assembly 50, in place along the mounting grooves 60 on the base 142. At the end of the sliding course, the joining member 44 reaches a position where it is automatically locked in a mounted position by the resilient locking mechanism comprising the flap 78 and the protrusion 80.

The steps further comprise electrically connecting the joining member 44 to the base 142, thus to the power grid. Accordingly, the step comprises plugging the connection end 94 to an appropriate electrical connection, usually a socket, of the joining member 44.

The steps further comprise adjusting the exterior lamp, comprising at any one of setting the controls, adjusting the aiming direction of the motion sensor component 20, and adjusting the aiming direction of the different light units 98.

According to embodiments, dismounting of the exterior lamp 10 comprises the steps of disconnecting the electrical connections, namely all electrical connections that are not embedded and that connects the light panel assembly to the power source, namely, the electrical connection exterior lamp 10 to the solar panel 15, the electrical connection joining the joining member 44 to another power source such as a powered base 142, etc.

Dismounting of the exterior lamp 10 further comprises the steps of moving and maintaining the flap 78 away from the joining member 44 and sliding up the joining member 44 so as to free the joining member 44, and thus the exterior light sub-assembly 50, from either the wall-mounted component (the base 42 or the base 142). Afterward, the exterior light sub-assembly 50 is free from any attachment.

The method optionally additionally comprises the step of dismounting the exterior light sub-assembly 50.

According to one embodiment, the method additionally comprises the step of dismounting the mounted base 42 from the mounted surface, namely the wall or ceiling.

According to another embodiment, the method additionally comprises the step of dismounting the mounted base 142 from the electrical connection box and electrically disconnecting the input electrical connection from the wires of the electrical connection box 90.

It is worth mentioning that the different components, namely the motion sensor component 20, the light panel assembly 30 and the body assembly 40, may be constructed with a different number of components, or disposed otherwise in relation with each other, in alternative embodiments. For example, different embodiments of an alternative to the base 42 or of the base 142 consists in one or more components that, once mounted on a wall, a ceiling or on an electrical connection box 90, would provide the desired mounting capability. The different embodiments of such a base provide the electrical coupling necessary for the exterior lamp 10 to perform based on grid-fed power. For example, some embodiments of such base include a box mounting component according to which the electrical connection is performed and on which are fastened, using screws or another appropriate fastening solution, one or more components performing the mounting function to couple the mounting component with such a base. Similarly, alternative embodiments of the joining member 44 comprise of a single piece or a combination of pieces assembled together and adapted to hold the light panel assembly 30 as a single component to be mounted on a base.

It is also worth mentioning that, according to alternative embodiments, the combination of groove and lips may be inverted in their locations on the base and the joining member. The grooves and lips may also cooperate according to a different general shape than the illustrated parallelepiped. For example, they can be embodied as a conical shape, a rectangular shape with an abutment (e.g. end wall) used to stop the course of the mounting component when mounted on the base, or other alternative embodiments.

Furthermore, the shape of the grooves and lips may differ. For example, the groove and lips on the base and the mounting component may consist of identical shapes combining the groove function and the lip function. They may take any other shape which allows the mounting through vertical (or horizontal) sliding of the joining member on a base without allowing horizontal (and vise versa) movement of the joining member relative to said base. However, in all of these embodiments, the joining member is assembled with the light panel assembly and is mounted on said base once the base is fastened either to the wall, ceiling or to the electrical connection box. The mounting solution allows positioning and holding the joining member into place without using screws or any other fastening solution. Once in position, a locking solution, such as the described flap or other alternatives, may be used to lock the mounting component into place.

According to embodiments, the nature of the light emitting components embedded in the light units and the presence or not of motion sensors or other controls may also vary. According to an embodiment, the light emitting components consist in Light Emitting Diode (LED)-based components. According to another embodiment, the light emitting components consist of incandescent lighting or fluorescent lighting. The controls may also use light-sensitive photocells for the exterior lamp 10 to light up only in appropriate conditions (e.g., at night, as dusk and dawn, or upon dark weather conditions).

It is further worth mentioning that the material in which the different components of the exterior lamp 10 may vary. Parts may be made of steel, copper, plastic, or other available material. The selected material, or combination of materials, must respect the requirements of the exterior lamp 10 in relation with electrical conductivity or insulation, adaptation to weather conditions, flexibility or rigidity, weight, weight holding capacity, resistance, etc. Accordingly, different embodiments may feature components in alternative material or combination of materials than other, with the size and shape of some parts being adapted in some case in relation with the selected materials.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A mounting adaptor for an electric light fixture to be mounted on a surface, the mounting adaptor comprising:
    a base and a joining member on which is mounted the electric light fixture, the base and the joining member each having an interfacing face, one of the base and the joining member comprising on its interfacing face a groove, the other one of the base and the joining member comprising on its interfacing face a lip adapted to cooperate with the groove thereby providing a capability to assemble releasably the joining member with the base; and
    a locking mechanism adapted to lock the base and the joining member in a mounted position relatively to each other, wherein the locking mechanism comprises a resilient member moving from an unlocked position to a locked position during an assembly of the joining member with the base;
    wherein the base comprises a mounting element adapted to mount the base to the surface;
    wherein each one of the interfacing faces comprises an electrical interface for electrical coupling with the electrical interface of the other one of the interfacing faces when assembling the base and the joining member; and
    wherein the joining member comprises a joint element adapted to mount mechanically the electric light fixture to the joining member.

2. The mounting adaptor of claim 1, wherein each one of the electrical interfaces comprises one of an electric plug and an electric socket.

3. The mounting adaptor of claim 1, wherein one of the electrical interface comprises a recess and the other of the electrical interface comprises a protruding foot to be coupled to the recess.

4. The mounting adaptor of claim 1, wherein one of the interfacing faces comprises a lower portion and an elevated portion, and wherein the mounting adaptor comprises a protruding extension for abutting the joining member.

5. The mounting adaptor of claim 1, wherein one of the base and the joining member comprises the resilient member comprising a protrusion, and the other one of the base and the joining member comprises a cavity, wherein the cavity receives the protrusion when the joining member is assembled with the base.

6. The mounting adaptor of claim 1, wherein the surface comprises an electrical connection box, the mounting adaptor further comprising an input electrical connection to be connected to the electrical connection box and to electrically connect to one of the electrical interfaces.

7. The mounting adaptor of claim 1, wherein the joint element comprises a projection adapted to mount the electric light fixture to the joining member defining a pivot axis, wherein the electric light fixture is orientable about the pivot axis.

8. The mounting adaptor of claim 2, wherein the interfacing faces operate along an interfacing plane, and wherein the electric plug and the electric socket extend along axes which are parallel to the interfacing plane.

9. The mounting adaptor of claim 2, wherein the electric plug is color-coded.

10. The mounting adaptor of claim 2, wherein one of the interfacing faces comprises a lower portion, an elevated portion and a wall joining the lower portion to the elevated portion, and wherein one of the electrical interface is located on the wall.

11. The mounting adaptor of claim 4, wherein the one of the interfacing faces comprises a wall joining the lower portion to the elevated portion, and wherein the protruding extension extends from one of the lower portion, the wall and the elevated portion.

12. The mounting adaptor of claim 5, wherein the resilient member comprises a flange, wherein said flange is for unlocking the joining member from the base.

13. The mounting adaptor of claim 10, wherein the electric plug extends from the wall.

14. A mounting adaptor for an electric light fixture to be mounted on an electrical connection box, the mounting adaptor comprising:
    a base and a joining member adapted to be releasably assembled to each other;
    the base comprising:
        a mounting element adapted to mount the base to the electrical connection box;
        an input electrical connection electrically connecting the base to the electrical connection box; and
        a first electrical interface;
    the joining member comprising:
        a joint element adapted to mount mechanically the electric light fixture to the joining member; and
        a second electrical interface for electrical coupling to the first electrical interface to electrically connect the base to the electric light fixture wherein the first electrical interface couples to the second electrical interface as the joining member is mounted to the base; and
    a locking mechanism adapted to lock the base and the joining member in a mounted position relatively to each other, wherein the locking mechanism comprises a resilient member moving from an unlocked position to a locked position during an assembly of the joining member with the base.

15. The mounting adaptor of claim 14, wherein one of the first electrical interface and second electrical interface comprises an electric plug and the other one the first electrical interface and second electrical interface comprises an electric socket, wherein the base and the joining member are electrically connected when the electric plug is connected to the electric socket.

16. The mounting adaptor of claim 14, wherein one of the base and the joining member comprises a lower portion, an elevated portion and wall joining the lower portion to the elevated portion, and wherein one of the first electrical interface and the second electrical interface is located on the wall.

17. The mounting adaptor of claim 14, wherein the base when mounted to the electrical connection box defines a cavity, wherein the input electrical connection further comprises an electric transformer, and wherein the electric transformer is housed within the cavity.

18. The mounting adaptor of claim 15, wherein the base and the joining member are sled relatively to each other along an interfacing plane to be assembled releasably, and wherein the electric plug and the electric socket extends along an axis parallel to the interfacing plane.

19. A mounting adaptor for an electric light fixture to be mounted on a surface, the mounting adaptor comprising:
- a base and a joining member on which is mounted the electric light fixture, the base and the joining member each having an interfacing face, one of the base and the joining member comprising on its interfacing face a groove, the other one of the base and the joining member comprising on its interfacing face a lip adapted to cooperate with the groove thereby providing a capability to assemble releasably the joining member with the base;
- wherein the base comprises a mounting element adapted to mount the base to the surface;
- wherein each one of the interfacing faces comprises an electrical interface for electrical coupling with the electrical interface of the other one of the interfacing faces when assembling the base and the joining member; and
- wherein the lip and the groove form a trapezoid having a narrow top and a broad base.

\* \* \* \* \*